(12) United States Patent
Kim

(10) Patent No.: US 6,269,626 B1
(45) Date of Patent: Aug. 7, 2001

(54) REGENERATIVE FUEL HEATING SYSTEM

(76) Inventor: Duk M. Kim, 5 Woodland Cir., Manalapan, NJ (US) 07726

( * ) Notice: Subject to any disclaimer, the term of this patent is extended or adjusted under 35 U.S.C. 154(b) by 0 days.

(21) Appl. No.: 09/540,851

(22) Filed: Mar. 31, 2000

(51) Int. Cl.$^7$ .................................................. F02C 6/1800
(52) U.S. Cl. ......................... 60/39.182; 60/736; 122/7 B
(58) Field of Search ........................ 60/736, 730, 39.182, 60/670; 122/7 B

(56) References Cited

U.S. PATENT DOCUMENTS

| | | | |
|---|---|---|---|
| 3,953,966 | * 5/1976 | Martz et al. | 60/39.182 |
| 4,099,374 | * 7/1978 | Foster-Pegg | 60/39.182 |
| 4,932,204 | 6/1990 | Pavel et al. | . |
| 5,345,755 | * 9/1994 | Bruckner et al. | 60/39.12 |
| 5,357,746 | 10/1994 | Myers et al. | . |
| 5,826,430 | 10/1998 | Little | . |
| 5,845,481 | 12/1998 | Briesch et al. | . |
| 6,041,588 | * 3/2000 | Bruckner et al. | 60/736 |
| 6,065,280 | * 5/2000 | Ranasinghe et al. | 60/736 |
| 6,101,982 | * 8/2000 | Fischer et al. | 122/7 R |
| 6,105,361 | * 8/2000 | Fetescu | 60/39.182 |
| 6,145,295 | * 11/2000 | Donovan et al. | 60/39.182 |

* cited by examiner

*Primary Examiner*—Ted Kim
(74) *Attorney, Agent, or Firm*—Frishauf, Holtz, Goodman, Langer & Chick, P.C.

(57) ABSTRACT

A combined cycle cogeneration power plant includes a combustion turbine formed by an inlet for receiving fuel, an inlet for receiving air, a combustor for burning the combustion fuel and the air, and an outlet through which hot gaseous combustion product is released; a regenerative fuel heating system formed by a plurality of heat exchangers for transferring heat to combustion fuel for heating the combustion fuel, and modulating control valves for controlling temperature of the combustion fuel; a heat recovery steam generator (HRSG) connected to the outlet of the combustion turbine for receiving the gaseous combustion product. The HRSG is formed by a plurality of heat exchangers including steam/water drums, each having a surface blowdown connection, and evaporators connected to the steam/water drums, a water inlet connected with the heat exchangers of the HRSG, a steam outlet, and a stack for releasing the exhausted gaseous combustion product. A steam turbine is provided, and has a steam inlet for receiving steam from the steam outlet of the HRSG, and an exhaust steam outlet; a condenser is connected to the exhaust steam outlet of the steam turbine for condensing steam to a liquid condensate; at least one pump is provided for supplying the liquid condensate from the condenser to the HRSG; and at least one pump is provided for supplying feed water from at least one drum to the HRSG. A conventional-type power plant with a regenerative fuel heating system is also disclosed.

17 Claims, 2 Drawing Sheets

REGENERATIVE FUEL HEATING SYSTEM

BACKGROUND OF THE INVENTION

This invention relates to gaseous fuel heating by a regenerative fuel heating system in a combined cycle cogeneration power plant.

Conventionally, a preferred combined cycle cogeneration power plant configuration includes at least one combustion turbine (which is also referred to as "gas turbine") driving an electrical generator for receiving combustion fuel, a combustion turbine having a multi-stage compressor for compressing ambient air, a combustion turbine having a combustor for the combustion process, and a combustion turbine having turbine blades for expanding the gaseous combustion product through the turbine blades. A heat recovery steam generator (HRSG) receives the gaseous combustion product from the combustion turbine for generating motive steam and includes a superheater, reheater, evaporator, economizer, preheater and steam/water evaporator drums. A steam turbine which drives an electrical generator for accepting motive steam from the HRSG, includes an extraction port for extracting steam for the process, an induction port for accepting induction steam, a reheat port for accepting reheat steam from the HRSG and a condensing port to release exhausted steam into condenser.

It is generally recognized that the most significant technique for improving efficiency of power plant generation is by means of a combined cycle cogeneration power plant system. Increasing power plant efficiency and power output have been a continuous goal throughout the power industry. One such goal has been in the area of fuel heating in the combined cycle cogeneration power plant.

Several known prior art systems have sought to improve plant efficiency and power output by means of preheating fuel by utilizing economizer water from the HRSG, preheating fuel by utilizing exhaust gas from the combustion turbine, preheating fuel by a second heat recovery system in the combustion turbine exhaust gas flow path or preheating fuel by recovering hot air or steam from a combustion turbine engine.

One approach described in U.S. Pat. No. 4,932,204 recovers heat available in the exhaust gas by increasing the water flow through the economizer section of the HRSG to a rate in excess of that required to match the steam production rate in the evaporator section. The excess water flow is withdrawn from the HRSG at a temperature approaching the evaporator temperature and used to preheat fuel delivered to the combustion turbine.

Another approach is taught by U.S. Pat. No. 5,357,746, which preheats fuel by utilizing exhaust gas from the combustion turbine by a second heat recovery system, using waste heat from the combustion turbine that is not recoverable from the first heat recovery system.

Yet another approach is taught by U.S. Pat. No. 5,826,430, which preheats fuel by using heated coolant such as steam or air returning from the gas turbine engine.

Still another approach is taught by U.S. Pat. No. 5,845,481, which preheats fuel by a fuel line disposed in heat transfer relationship within the exhaust gas from the combustion turbine so that the fuel may be heated by the exhaust gas prior to being introduced into the combustor.

Such prior art systems have failed to recognize that the most efficient power plant has already been achieved through a combined cycle cogeneration power plant configuration. In addition, such prior art systems have all failed to recognize that there would be no additional energy recoverable without imposing penalties on the most efficient combined cycle cogeneration power plant.

SUMMARY OF THE INVENTION

Accordingly, it is an object of the invention to provide a combined cycle cogeneration power plant as well as a conventional power plant with a fuel heating system which provides a better overall efficiency than those of which have been realized heretofore.

It is another object of the invention to provide a combined cycle cogeneration power plant with a fuel heating system which recovers useful thermal energy from the HRSG steam/water evaporator drum surface blowdown which is currently released to surrounding environment.

It is still another object of the invention to provide heat exchangers of a fuel heating system for recovering waste thermal energy from the HRSG steam/water evaporator drum surface blowdowns to provide higher plant efficiency to the most efficient design basis of the thermodynamic cycle of the combined cycle cogeneration power plant.

It is yet another object of the invention to provide a combined cycle cogeneration power plant with heat exchangers in cascaded heat exchange relationship for providing cascaded heating capability of the combustion fuel prior to injecting the same into the combustion chamber of a combustion turbine.

It is a further object of the invention to provide a combined cycle cogeneration power plant with a regenerative fuel heating system which eliminates high thermal energy release into the atmosphere and provides effective means of mitigating thermal discharge impact to the surrounding environment.

It is a still further object of the invention to provide a combined cycle cogeneration power plant with a regenerative fuel heating system which recovers currently-being-wasted steam and condensate from the HRSG steam/water evaporator drum surface blowdown and preheats gaseous fuel prior to injecting the same into the combustion chamber.

The regenerative fuel heating system of the present invention provides a higher efficiency than prior art systems of a combined cycle cogeneration power plant by recovering currently-being-wasted thermal energy within the thermodynamic cycle of a power plant.

In accordance with an aspect of the present invention, a regenerative fuel heating system in a combined cycle cogeneration power plant includes heat exchangers for receiving and preheating the combustion fuel in heat exchange relationship with waste thermal energy prior to injecting the combustion fuel into the combustor, the heat exchangers having at least a first inlet and at least a first outlet through which the combustion fuel can be supplied and the preheated combustion fuel can be injected into the combustor, and having at least a second inlet and at least a second outlet through which the thermal waste energy can be supplied and discharged after heat exchange relationship with the combustion fuel. These heat exchangers can be configured in cascaded heat exchange relationship for providing cascaded heating capability of the combustion fuel prior to injecting into the combustor.

In accordance with another aspect of the present invention, a regenerative fuel heating system in a combined cycle cogeneration power plant includes a heat exchanger for accepting thermal energy from the HRSG high pressure high temperature steam/water evaporator drum surface blowdown to preheat the combustion fuel, another heat exchanger for recovering an intermediate and/or a low pressure and temperature steam/drum surface blowdowns from the HRSG to control the desired fuel temperature prior to cascading into the high pressure, high temperature heat exchanger.

Traditionally, the heat recovery steam generator (HRSG) includes superheaters, reheaters, evaporators, economizers, preheaters and steam/water evaporator drums. The HRSG is connected to the exhaust of a combustion turbine to recover gaseous combustion product to generate motive steam as a final product to be used by a steam turbine or as a process steam for the industries. The motive steam is produced by a gradual process of changing fluid phase from a liquid phase (feedwater to HRSG) to a vapor phase by heat transfer through the preheater, economizer, evaporator and superheater. Each evaporator includes a steam/water evaporator drum directly connected to each evaporator for accepting two phase flow (liquid and vapor) in which the vapor phase and the liquid phase become as a separate phase.

All steam/water evaporator drums need to be blowndown continuously to mitigate or avoid collecting impurities and scale concentration in the drum as steam is transported and used. These impurities and scales are introduced in by way of the HRSG feedwater and cause corrosion, pitting and degrading of the heat exchange rate.

In a combined cycle cogeneration power plant, scales and impurities are blowndown through the blowdown lines to low pressure blowdown flash tanks where they are flashed to steam and liquid phases. The flashed steam is released to the atmosphere while the liquid is discharged to the sewer, having cooled below the temperature allowed by the Department of Environmental Protection (DEP). The blowdown flow is normally clean for heat transfer in the heat exchanger but not desirable for HRSG makeup water. Normal accepted practice in the power industry is a continuous 1–2% blowdown flow rate depending on the characteristics of feedwater in the HRSG. The 1–2% blowdown rate is set manually by the operator and is kept open for continuous blowdown in order to maintain the desired water chemistry in the HRSG. The blowdown flow is continuously discharged to the surrounding environment.

It is therefore desired to provide a fuel heating system with heat exchangers which are capable of recovering high temperature waste thermal energy and preheating combustion fuel prior to injecting fuel into the combustor and which also provide higher efficiency of a combined cycle cogeneration power plant than those of which have been realized in the prior art.

It is further desired to provide a fuel heating system with heat exchangers which are capable of eliminating high thermal energy release into the atmosphere and provide effective means of mitigating thermal discharge impact to the surrounding environment.

The above and the other objects and advantages of the invention will become readily apparent from the following detailed description thereof which is to be read in conjunction with the accompanying drawing.

DETAILED DESCRIPTION

Figure 1:
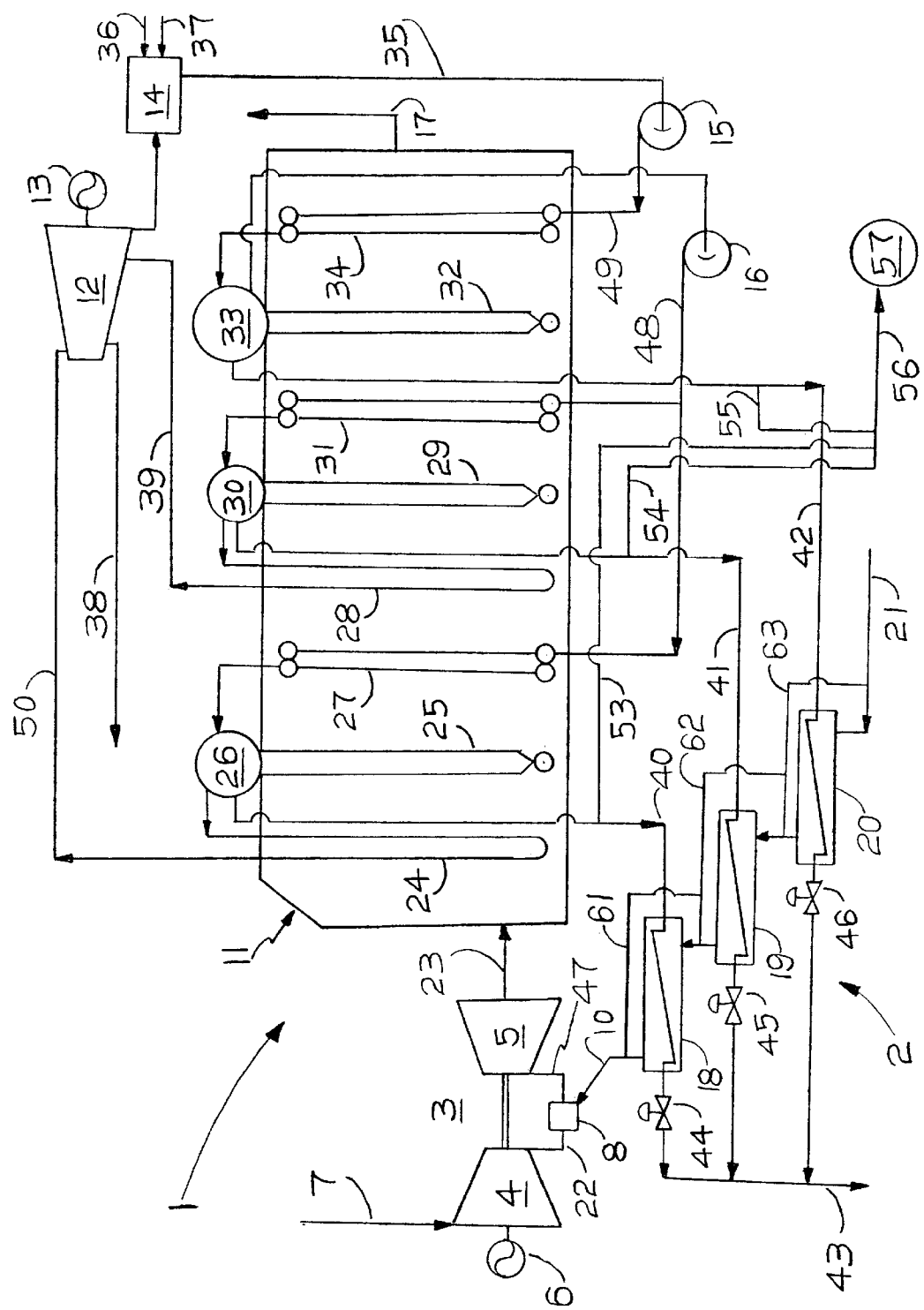
FIG. 1 is a diagrammatical view of a combined cycle cogeneration power plant according to the present invention.

Referring to FIG. 1, a combined cycle cogeneration power plant 1 with a regenerative fuel heating system 2 in accordance with the present invention generally includes a combustion turbine 3 directly coupled to an electrical generator 6, a heat recovery steam generator (HRSG) 11, a steam turbine 12 directly coupled to an electrical generator 13, a condenser 14 connected to steam turbine 12, a condensate supply pump 15, a feedwater supply pump 16 and an exhaust stack 17.

Combustion turbine 3 includes a combustor 8 connected to a fuel supply 10. Fuel supply 10 is connected to heat exchangers 18, 19 and 20 which receive fuel from a fuel supply source 21, whereby fuel supply 10 transports preheated fuel into combustor 8. A multistage compressor 4 receives ambient air 7 and provides compressed air 22 to combustor 8. The compressed air goes through a combustion process in combustor 8 with the preheated fuel. The high temperature combustion product 47 therefrom expands through a multi-stage turbine 5, and the expanded hot gaseous combustion product is emitted through an exhaust port (or diffuser) 23 into HRSG 11.

HRSG 11 receives hot gaseous combustion product from combustion turbine exhaust port 23 and generates motive steam 50 and 39 as final products or for producing useful high temperature water (not shown) from the economizers 34, 31 or 27 coincident with motive steam production. HRSG 11 includes, in general and in order, a superheater section 24, a high pressure/high temperature (HPHT) evaporator section 25, a drum 26 directly connected to HPHT evaporator section 25, a high pressure/high temperature (HPHT) economizer section 27, an intermediate pressure/intermediate temperature (IPIT) superheater section 28, an IPIT evaporator section 29, a drum 30 directly connected to IPIT evaporator section 29, an IPIT economizer section 31, a low pressure/low temperature (LPLT) evaporator section 32, a drum 33 directly connected to LPLT evaporator section 32, an LPLT economizer section 34 (or preheater) and stack 17 to discharge exhausted gaseous combustion product to atmosphere.

Specifically, the hot gaseous combustion product from combustion turbine exhaust port 23 passes through these heat exchanger components of HRSG 11 to conduct heat transfer, starting from HPHT superheater section 24 to the last section of the LPLT economizer section 34, while feedwater 48 and condensate water 49 from their respective pumps 16 and 15 flow through from economizer sections 34, 31 and 27 to final superheater sections 28 and 24.

Steam turbine 12 receives motive steam via steam line 50 from HPHT superheater section 24 in HRSG 11, and the motive steam from steam line 50 is expanded through the steam turbine 12 and exhausted into condenser 14 as a heat sink. This exhaust steam is condensed in condenser 14 as a liquid 35 and returns to HRSG 11 through condensate supply pump 15. Condenser 14 also includes make-up water line 36 and a condensate return line 37 from the industrial process. Steam turbine 12 can be equipped with an extraction steam line 38 for industrial process useage or an induction steam line 39 for receiving induction steam or motive steam via line 39 from HRSG 11 for additional power generation.

In order to protect wetted parts and components in HRSG 11 and steam turbine 12 from corrosion, pitting and stress cracking, the feedwater and the condensate must be chemically treated. However, with chemically treated and coincident introduction of impurities in make-up water supplied via line 36 and condensate return in line 37 from the process usage, the level of the dissolved concentration in HRSG 11 continuously increases. The higher the pressure and temperature in HRSG 11, the tighter control of water chemistry that is required in accordance with the requirements of the American Boiler Manufacturer Association. To prevent exceeding the limit of a dissolved concentration in HRSG 11, saturated liquid is continuously withdrawn (or blowndown) from the surface of the steam/water evaporator drums of HRSG 11.

Steam/water evaporator drums 26, 30 and 33 which are connected to their respective evaporators are required to be continuously blowndown in order to eliminate dirt, sediments and scale in HRSG 11. Current industry practice is to blowdown into a flash tank 57, discharge the flashed steam into the atmosphere and the liquid into the sewer or the like. Such an industry practice is not desirable and is wasteful of useful thermal energy.

Therefore, a regenerative fuel heating system 2 including heat exchangers 18, 19 and 20 is provided. These heat exchangers 18, 19 and 20 are shell and tube heat exchangers that receive HPHT, IPIT and LPLT surface liquid blowdown fluids from evaporator drums 26, 30 and 33 through the blowdown pipings 40, 41 and 42, respectively, to accomplish cascade heating of incoming combustion fuel supplied via fuel line 21 prior to injecting the same into combustor 8. The heat transferred low temperature liquid in discharge line 43 from HPHT, IPIT and LPLT blowdowns is then discharged to the sewer or to an appropriate discharge point (via line 43). Each heat exchanger 18, 19 and 20 includes a flow modulating control valve 44, 45, or 46, respectively, on a downstream side of each heat exchanger 18, 19, 20 to maintain the liquid phase of the fluid for maximum heat transfer capability and the heat exchangers are normally positioned at the ground level of HRSG 11 to maintain the liquid phase of the blowdown fluids. In addition, the regenerative fuel heating system 2 includes blowdown bypasses 53, 54 and 55 to blowdown liquid into flash tank 57 for an emergency operating mode condition. Further, the regenerative fuel heating system 2 includes fuel supply bypass lines 61, 62 and 63 around each heat exchanger 18, 19 and 20, respectively.

The preferred embodiment of the regenerative fuel heating system 2 and the number of heat exchangers 18, 19, 20 and the number of blowdown sources 40, 41, 42 can be varied depending on the equipment or the component arrangements of HRSG 11.

The regenerative fuel heating system described above has various advantages and benefits which uniquely characterize the present invention over the prior art.

For example, regenerative fuel heating system of the present invention provides overall higher plant efficiency by injecting preheated combustion fuel into the combustor by utilizing recovered high thermal energy currently being released-to the surrounding environment. The regenerative fuel heating system of the present invention also provides reduced fuel consumption by putting back high thermal energy currently being wasted into the thermodynamic cycle of the combined cycle power plant. The regenerative fuel heating system eliminates high thermal energy release to the atmosphere and mitigates thermal discharge impact to the surrounding environment. Still further, the regenerative fuel heating system of the present invention maintains a very efficient combined cycle power plant thermodynamic cycle without imposing penalties as in the prior art systems.

Although a combined cycle cogeneration power plant 1 has been depicted with reference to a particular arrangement of components, parts, features and the like, these are not intended to exhaust all possible arrangements and features and indeed many other features, arrangements and variations will be available to those skilled in the art including but not limited to the revisions of and/or modifications to the features and arrangements or any other reasons.

The present invention has been described above relative to gaseous fuel heating by a regenerative fuel heating system in a combined cycle cogeneration power plant. The invention is also equally applicable to a conventional thermal power plant as described below, and the fuel that is used can also be a liquid fuel.

Figure 2:
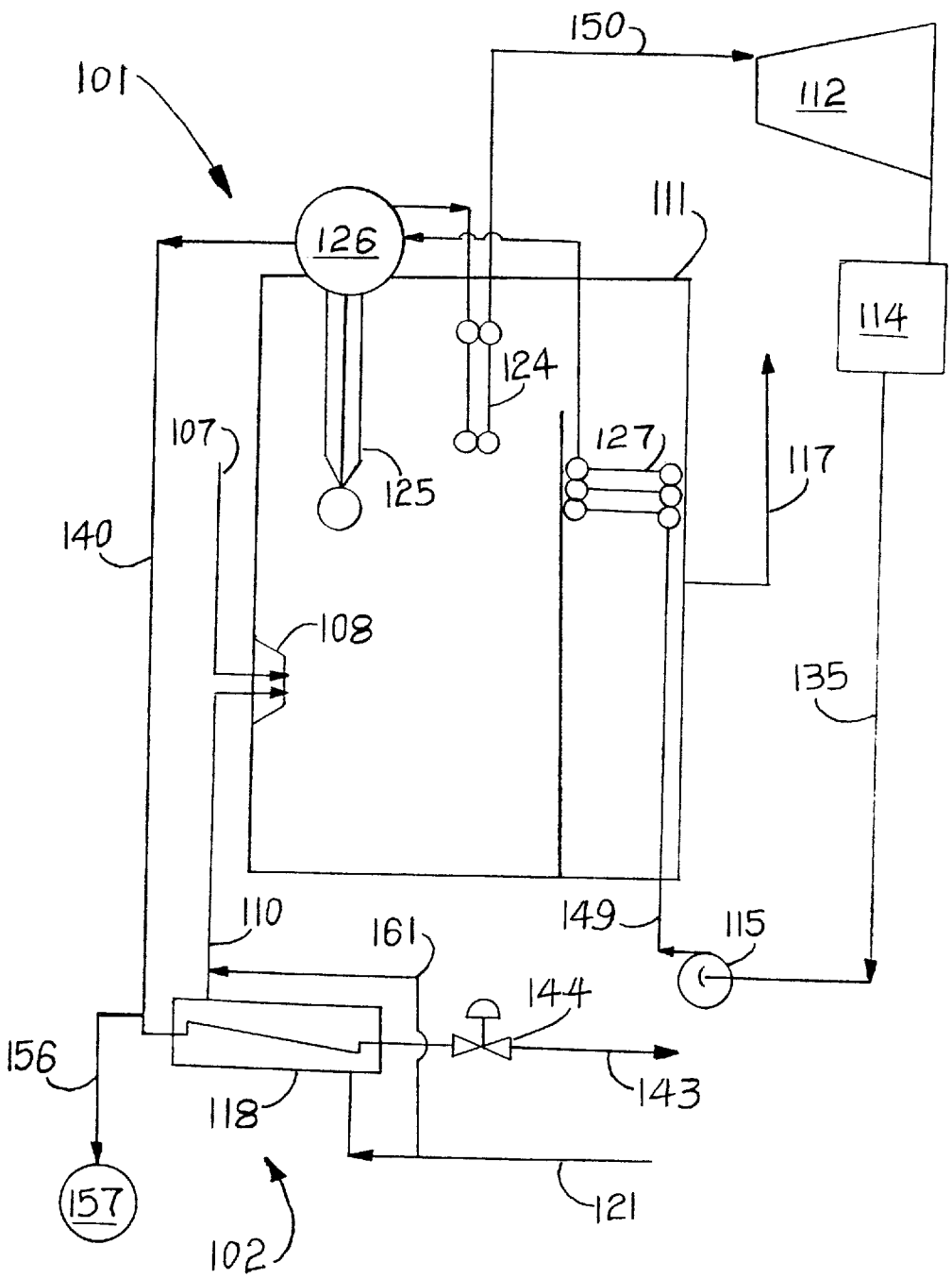
FIG. 2 is a diagrammatical view of a conventional power plant according to the present invention.

Referring to FIG. 2, a conventional power plant 101 with a regenerative fuel heating system 102 in accordance with the present invention generally includes a boiler 111, a steam turbine 112, a condenser 114 and a feedwater pump 115.

Boiler 111 includes a combustion chamber 108 connected to a fuel supply line 110. This fuel supply line 110 is connected to a heat exchanger 118 which receives fuel from a fuel supply source 121, whereby fuel supply line 110 transports preheated combustion fuel into combustion chamber 108. The combustion chamber 108 receives ambient air 107 and goes through a combustion process with preheated fuel from fuel supply line 110.

Boiler 111 includes, in general, a superheater section 124, an evaporator section 125, a steam/water drum 126 directly connected to evaporator 125, an economizer 127 and a stack 117. The hot gaseous combustion product passes through these heat exchange components in the boiler 111 to conduct heat transfer up to and including the economizer section 127 while feedwater 149 from the feedwater pump 115 flows through economizer section 127 to final superheater section 124 to generate superheated steam.

Steam turbine 112 receives motive steam via steam line 150 from the superheater section 124 in boiler 111, and the motive steam from steam line 150 is expanded through the steam turbine 112 and exhausted into condenser 114 as a heat sink. The feedwater pump 115 receives condensed liquid via condensate liquid supply line 135 from the condenser 114.

Steam/water evaporator drum 126 is required to be blowndown continuously in order to eliminate dirt, sediments and scale in the boiler 111.

A regenerative fuel heating system 102 includes a heat exchange 118. This heat exchanger is a shell and tube type heat exchanger that receives surface liquid blowdown fluid from the evaporator steam/water drum 126 through blowdown piping 140 to accomplish heat exchange relationship with incoming combustion fuel supplied via combustion fuel supply line 121 prior to injecting the same into combustion chamber 108. The heat transferred low temperature liquid in discharge line 143 is then discharged via modulating flow control valve 144 to the sewer or to an appropriate discharge point.

The combustion process, the gaseous combustion product path, the feedwater flow path, steam flow path, and the blowdown from the boiler steam/water drum are, in general, similar to the process and the paths described in the combined cycle power plant in FIG. 1.

The heat exchange relationship between the fuel supply from fuel supply line 121 to heated fuel supply line 110 and the blowdown fluid from the blowdown line 140 to blowdown line 143 is also in general, similar to the process path described in the combined cycle power plant as shown in FIG. 1.

The functional and operational requirements of the heat exchanger and modulating control valve and the arrangements including the fuel bypass line 161 arrangement and the blowdown bypass line 156 arrangement are, in general, similar to the combined cycle cogeneration power plant arrangement as shown in FIG. 1.

Having described specific preferred embodiments of the invention with reference to the accompanying drawings, it will be appreciated that the present invention is not limited to those precise embodiments and that various changes and/or modifications can be effected therein by one skilled in the art without departing from the scope or spirit of the invention as defined by the appended claims.

What is claimed is:

1. A combined cycle cogeneration power plant comprising:
    a source of combustion fuel;
    a combustion turbine including:
        a fuel inlet for receiving combustion fuel,
        an air inlet for receiving air,
        a combustor for burning said combustion fuel and said air, and
        an outlet through which hot gaseous combustion product can be released;
    a heat recovery steam generator (HRSG) connected to said outlet of said combustion turbine for receiving said hot gaseous combustion product, said HRSG including:
        a plurality of heat exchangers each including a steam/water drum having at least one surface blowdown connection, a plurality of evaporators connected to respective steam/water drums, and a plurality of economizers each connected to a respective steam/water drum,
        a water inlet connected with at least one of the economizers of the HRSG,
        a steam outlet, and
        a stack for releasing said hot gaseous combustion product;
    a regenerative fuel heating system (RFHS) coupled to said source of combustion fuel, and including:
        a plurality of heat exchangers for transferring heat to said combustion fuel for heating said combustion fuel prior to receipt of said combustion fuel at said fuel inlet,
        each heat exchanger of said RFHS being coupled to a blowdown connection of a respective steam/water drum of said HRSG, and
        a plurality of modulating control valves, each control valve being connected downstream of a respective heat exchanger of said RFHS to thereby control flow conditions in the respective heat exchanger of said RFHS to thereby control temperature of said combustion fuel;
    a steam turbine having a steam inlet for receiving steam from the steam outlet of the HRSG, and an exhaust steam outlet from the said steam turbine;
    a condenser connected to said exhaust steam outlet of said steam turbine for condensing steam to a liquid condensate; and
    at least one pump for supplying water to said HRSG.

2. A combined cycle cogeneration power plant according to claim 1, wherein said combustion turbine further includes:
    at least one fuel supply line to said fuel inlet for receiving said combustion fuel, said at least one fuel supply line connected to said regenerative fuel heating system and said combustor for delivery of heated combustion fuel to said combustor, and
    a compressor for compressing said air supplied from said air inlet, said compressor being communicated with said combustor such that said combustor burns said heated combustion fuel and said compressed air therein and produces said hot gaseous combustion product; and
    a turbine in communication with said combustor and said compressor, and driven by said gaseous combustion product for discharging said gaseous combustion product through said outlet of said combustion turbine.

3. A combined cycle cogeneration power plant according to claim 1, wherein said HRSG is positioned downstream from said outlet of said combustion turbine and is arranged in heat transfer relationship between said gaseous combustion product output from said combustion turbine and said water and steam flowing therethrough.

4. A combined cycle cogeneration power plant according to claim 1, wherein:
    at least one of said heat exchangers of said HRSG includes at least one superheater connected to a respective steam/water drum of said HRSG;
    at least one of said evaporators includes:
        a high pressure high temperature (HPHT) evaporator,
        an intermediate pressure intermediate temperature (IPIT) evaporator, and
        a low pressure low temperature (LPLT) evaporator; and
    at least one of said steam/water drums includes:
        a high pressure high temperature (HPHT) steam/water drum connected to the HPHT evaporator,
        an intermediate pressure intermediate temperature (IPIT) steam/water drum connected to the IPIT evaporator, and
        a low pressure low temperature (LPLT) steam/water drum connected to the LPLT evaporator.

5. A combined cycle cogeneration power plant according to claim 1, wherein said surface blowdown connections discharge saturated liquid from said respective steam/water drum and are respectively connected to heat exchangers of said RFHS.

6. A combined cycle cogeneration power plant according to claim 5, wherein said saturated liquid is released fluid from said steam/water drums to control water chemistry in the HRSG.

7. A combined cycle regeneration power plant according to claim 1, wherein said regenerative fuel heating system is positioned on ground level of said HRSG.

8. A combined cycle cogeneration power plant according to claim 1, wherein:
    said plurality of heat exchangers in said regenerative fuel heating system is positioned on the ground level of the said HRSG to maintain said saturated liquid to inlets of said heat exchangers in the regenerative fuel heating system as closely as possible at a liquid phase condition to thereby mitigate two-phase flow of said saturated liquid within the heat exchangers in the regenerative fuel heating system.

9. A combined cycle cogeneration power plant comprising:
    a source of combustion fuel;
    a combustion turbine including:
        a fuel inlet for receiving combustion fuel,
        an air inlet for receiving air,
        a combustor for burning said combustion fuel and said air, and
        an outlet through which hot gaseous combustion product can be released;
    a regenerative fuel heating system coupled to said source of combustion fuel, and including:

at least one heat exchanger for transferring heat to said combustion fuel for heating said combustion fuel prior to receipt of said combustion fuel at said fuel inlet, and at least one modulating control valve at said at least one heat exchanger for controlling temperature of said combustion fuel;

a heat recovery steam generator (HRSG) connected to said outlet of said combustion turbine for receiving said hot gaseous combustion product, said HRSG including:

at least one heat exchanger including at least one steam/water drum having at least one surface blowdown connection, at least one evaporator connected to the at least one steam/water drum, and at least one economizer, a water inlet connected with the at least one heat exchanger of the HRSG, a steam outlet, and a stack for releasing said hot gaseous combustion product;

a steam turbine having a steam inlet for receiving steam from the steam outlet of the HRSG, and an exhaust steam outlet from the said steam turbine;

a condenser connected to said exhaust steam outlet of said steam turbine for condensing steam to a liquid condensate; and at least one pump for supplying water to said HRSG;

wherein said at least one heat exchanger in the regenerative fuel heating system includes:

at least one high pressure high temperature (HPHT) shell-and-tube heat exchanger with an inlet and an outlet, at least one intermediate pressure intermediate temperature (IPIT) shell-and-tube heat exchanger with an inlet and an outlet, at least one low pressure low temperature (LPLT) shell-and-tube heat exchanger with an inlet and an outlet; and said at least one modulating control valve is arranged to control flow of said saturated liquid from said at least one surface blowdown connection, and is positioned at an outlet of said at least one heat exchanger of said regenerative fuel heating system, and wherein said at least one modulating control valve maintains said saturated liquid close to liquid phase.

10. A combined cycle cogeneration power plant according to claim 9, wherein said regenerative fuel heating system includes a plurality of heat exchangers, and wherein at least two of said heat exchangers of said regenerative fuel heating system are in cascaded heat transfer relationship.

11. A combined cycle cogeneration power plant according to claim 9, wherein:

said at least one shell-and-tube heat exchanger in the regenerative fuel heating system includes:

a first inlet connected to a combustion fuel source, a first outlet connected to said combustor of said combustion turbine with a portion of fuel from said combustion fuel source being disposed for heat transfer relationship with said saturated liquid in said heat exchangers in the regenerative fuel heating system, a second inlet connected to said surface blowdown connection of the HRSG for heat transfer relationship with said combustion fuel in said heat exchangers of said regenerative fuel heating system, and a second outlet for passing through said saturated liquid input through said inlet, said heat exchangers and said modulating control valve.

12. A combined cycle cogeneration power plant according to claim 11, wherein said portion of said combustion fuel from said combustion fuel source is continuously cascaded through said heat exchangers in said regenerative fuel heating system for heat transfer relationship with said saturated liquid in said heat exchangers for fuel heating.

13. A combined cycle cogeneration power plant according to claim 12, further including a bypass for supplying fuel from said combustion fuel source without passing through said at least one heat exchanger of said regenerative fuel heating system.

14. A combined cycle cogeneration power plant according to claim 9, wherein said at least one heat exchanger of the HRSG further includes means for receiving thermal energy from another source in the HRSG.

15. A combined cycle cogeneration power plant according to claim 9, wherein:

said at least one heat exchanger in the regenerative fuel heating system includes:

an HPHT blowdown line connecting said HPHT steam/water drum of said HRSG to said HPHT shell-and-tube heat exchanger;

an IPIT blowdown line connecting said IPIT steam/water drum of said HRSG to said IPIT shell-and-tube heat exchanger; and an LPLT blowdown line connecting said LPLT steam/water drum of said HRSG to said LPLT shell-and-tube heat exchanger.

16. A combined cycle cogeneration power plant comprising:

a source of combustion fuel;

a combustion turbine including:

a fuel inlet for receiving combustion fuel, an air inlet for receiving air, a combustor for burning said combustion fuel and said air, and an outlet through which hot gaseous combustion product can be released;

a regenerative fuel heating system coupled to said source of combustion fuel, and including:

at least one heat exchanger for transferring heat to said combustion fuel for heating said combustion fuel prior to receipt of said combustion fuel at said fuel inlet, and at least one modulating control valve at said at least one heat exchanger for controlling temperature of said combustion fuel;

a heat recovery steam generator (HRSG) connected to said outlet of said combustion turbine for receiving said hot gaseous combustion product, said HRSG including:

at least one heat exchanger including at least one steam/water drum having at least one surface blowdown connection, at least one evaporator connected to the at least one steam/water drum, and at least one economizer, a water inlet connected with the at least one heat exchanger of the HRSG, a steam outlet, and a stack for releasing said hot gaseous combustion product;

a steam turbine having a steam inlet for receiving steam from the steam outlet of the HRSG, and an exhaust steam outlet from the said steam turbine;

a condenser connected to said exhaust steam outlet of said steam turbine for condensing steam to a liquid condensate; and at least one pump for supplying water to said HRSG;

wherein said at least one surface blowdown connection discharges saturated liquid from said at least one steam/water drum and is connected to said at least one heat exchanger of said regenerative fuel heating system; and wherein said at least one surface blowdown connection further includes a bypass line connected directly to a flash tank for bypassing said at least one heat exchanger of said regenerative fuel heating system in an emergency operating mode.

17. A combined cycle cogeneration power plant according to claim 16, wherein said at least one modulating control valve controls said saturated liquid flow through said at least one heat exchanger of said regenerative fuel heating system for controlling temperature of said combustion fuel.

* * * * *